United States Patent
Anderson

(10) Patent No.: US 7,234,664 B1
(45) Date of Patent: Jun. 26, 2007

(54) DRAW SPRING LINKAGE, PARTICULARLY FOR LIGHT AIRCRAFT

(76) Inventor: Brent W. Anderson, 1580 SW. Dellwood Ct., Portland, OR (US) 97225

( * ) Notice: Subject to any disclaimer, the term of this patent is extended or adjusted under 35 U.S.C. 154(b) by 517 days.

(21) Appl. No.: 10/913,088

(22) Filed: Aug. 6, 2004

Related U.S. Application Data

(60) Provisional application No. 60/493,438, filed on Aug. 8, 2003.

(51) Int. Cl.
*B64C 25/50* (2006.01)
*B60G 13/00* (2006.01)

(52) U.S. Cl. ............. 244/50; 244/100 R; 267/195; 267/197; 267/202; 267/216; 267/248; 403/109.3; 403/377

(58) Field of Classification Search ........ 267/195, 267/197, 202, 216, 248, 136; 403/109.3, 403/377; 244/50, 100 R, 104 R
See application file for complete search history.

(56) References Cited

U.S. PATENT DOCUMENTS 3,957,260 A * 5/1976 Martin ................. 267/174
5,901,947 A * 5/1999 Fotino et al. ............ 267/220
6,702,266 B1 * 3/2004 Dec ...................... 267/205
6,782,903 B1 * 8/2004 Jarman et al. ............ 135/75
2006/0278755 A1 * 12/2006 Bachmeyer et al. ....... 244/50

* cited by examiner

*Primary Examiner*—J. Woodrow Eldred
(74) *Attorney, Agent, or Firm*—John Smith-Hill; Smith-Hill and Bedell

(57) ABSTRACT

A draw spring linkage includes a hollow rod formed with a shoulder structure at the first end of the rod and with a slot that extends longitudinally of the rod and is located between the shoulder structure and the second end of the hollow rod. A tongue member includes an attachment portion and a stem that projects from the attachment portion. The stem fits slidingly in the interior space of the hollow rod and is formed with a slot that is aligned with the slot in the hollow rod. A key extends through the slot in the tongue member and the slot in the hollow rod and projects laterally from the hollow rod. A hollow cylindrical spring is threaded by the hollow rod. The first end of the spring engages the shoulder structure, the second end of the spring engages the key, and the spring is held under compression between the shoulder structure and the key.

16 Claims, 2 Drawing Sheets

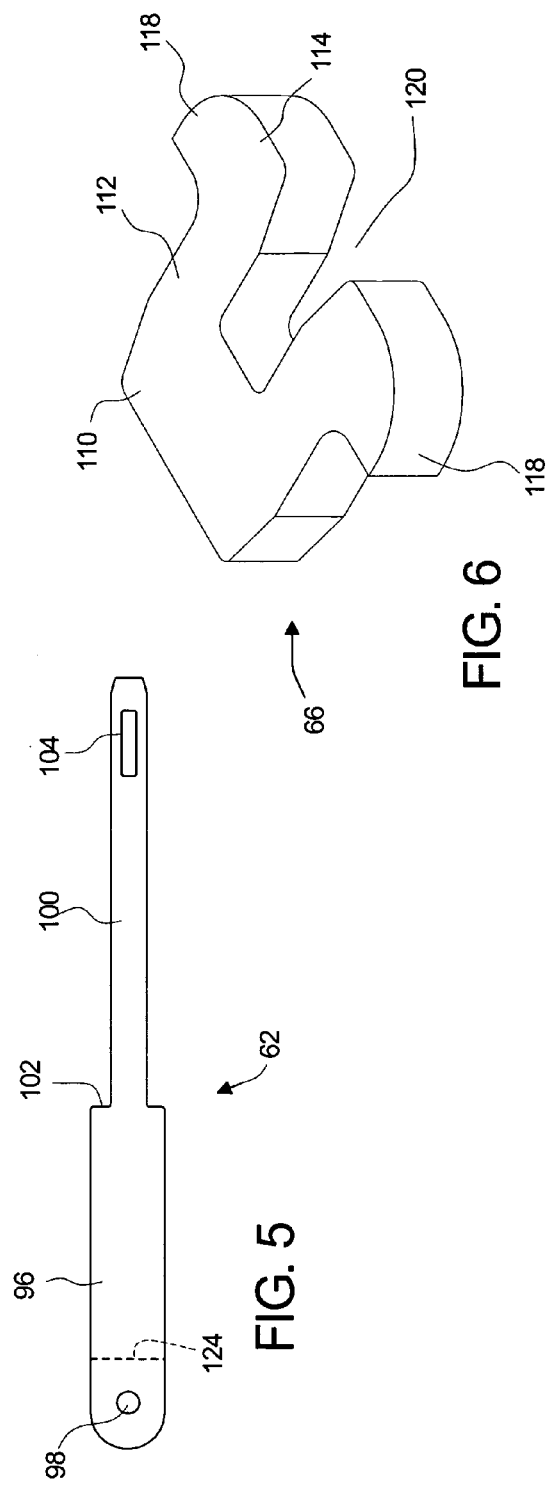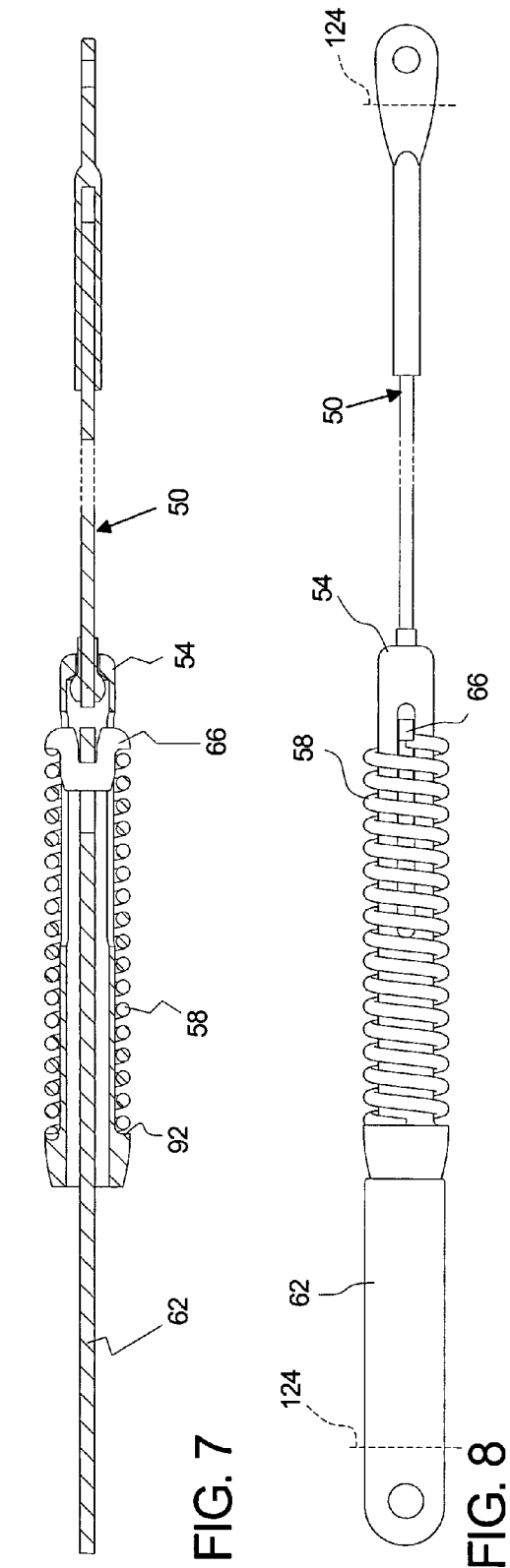

DRAW SPRING LINKAGE, PARTICULARLY FOR LIGHT AIRCRAFT

CROSS REFERENCE TO RELATED APPLICATION

This application claims benefit of U.S. Provisional application No. 60/493,438 filed Aug. 8, 2003.

BACKGROUND OF THE INVENTION

This invention relates to a draw spring linkage, particularly a tail wheel draw spring linkage for a light aircraft.

A conventional light aircraft has a vertical stabilizer and a rudder that is attached to the vertical stabilizer and is pivotable relative to the vertical stabilizer about an approximately vertical axis. Rudder control cables are connected to a rudder control horn (a generally horizontal bar that is attached to the rudder at its lower end and extends to each side of the rudder) to allow the pilot to adjust the angular position of the rudder in flight.

Light aircraft with conventional landing gear are commonly equipped with spring-loaded tail wheel steering linkages that connect the rudder control horn to the tail wheel for positive steering control while on the ground. Typically, the tail wheel is mounted for pivotal movement about an axis that is approximately parallel to the pivotal axis of the rudder and is coupled to a tail wheel horn (a generally horizontal bar that is attached to the tail wheel and extends to each side of the tail wheel). The traditional tail wheel steering linkages comprise draw springs that are connected between the control horns of the rudder and the tail wheel. The draw springs provide shock absorption to protect the rudder control system in the event that the wheel strikes an irregularity during taxiing, take-off or landing. The draw spring linkage is constructed so that the two ends of the linkage remain connected even if the spring fails. The draw spring that is used in the traditional tail wheel steering linkage has some disadvantages, including the fact that it is bulky and not aerodynamic, it is prone to corrosion, and the clips that attach the linkage to the tail wheel control horn may open up and detach in use unless they are wired closed.

SUMMARY OF THE INVENTION

In accordance with a first aspect of the invention there is provided a draw spring linkage comprising an elongate hollow rod defining an interior space extending longitudinally of the rod, the hollow rod having first and second opposite ends and being formed with a shoulder structure at the first end of the rod and with a slot that extends longitudinally of the rod and is located between the shoulder structure and the second end of the hollow rod, a tongue member comprising an attachment portion and a stem that projects from the attachment portion, wherein the stem fits slidingly in the interior space of the hollow rod and is formed with a slot that is aligned with the slot in the hollow rod, a key member that extends through the slot in the tongue member and the slot in the hollow rod and projects laterally from the hollow rod, and a hollow cylindrical spring member having first and second ends, the hollow spring member being threaded by the hollow rod, the first end of the spring member engaging the shoulder structure, the second end of the spring member engaging the key member, and the spring member being held under compression between the shoulder structure and the key member.

In accordance with a second aspect of the invention there is provided an aircraft comprising a rudder, a rudder control horn secured to the rudder for transmitting pilot effort to the rudder, a tail wheel, a tail wheel control horn secured to the tail wheel and having two opposite ends, a first tail wheel steering linkage attaching the first end of the rudder control horn to the first end of the tail wheel control horn and a second tail wheel steering linkage attaching the second end of the rudder control horn to the second end of the tail wheel control horn, for transmitting effort from the rudder control horn to the tail wheel, wherein each tail wheel steering linkage comprises an elongate hollow rod defining an interior space extending longitudinally of the rod, the hollow rod having first and second opposite ends and being formed with a shoulder structure at the first end of the rod and with a slot that extends longitudinally of the rod and is located between the shoulder structure and the second end of the hollow rod, a tongue member comprising an attachment portion and a stem that projects from the attachment portion, wherein the stem fits slidingly in the interior space of the hollow rod and is formed with a slot that is aligned with the slot in the hollow rod, a key member that extends through the slot in the tongue member and the slot in the hollow rod and projects laterally from the hollow rod, and a hollow cylindrical spring member having first and second ends, the hollow spring member being threaded by the hollow rod, the first end of the spring member engaging the shoulder structure, the second end of the spring member engaging the key member, and the spring member being held under compression between the shoulder structure and the key member.

BRIEF DESCRIPTION OF THE DRAWINGS

For a better understanding of the invention, and to show how the same may be carried into effect, reference will now be made, by way of example, to the accompanying drawings, in which FIG. 5 is a plan view of the tongue element, FIG. 6 is a perspective view of the key element, FIG. 7 is a vertical sectional view of the linkage when fully assembled, and FIG. 8 is a top plan of the linkage shown in FIG. 7.

DETAILED DESCRIPTION

Figure 1:
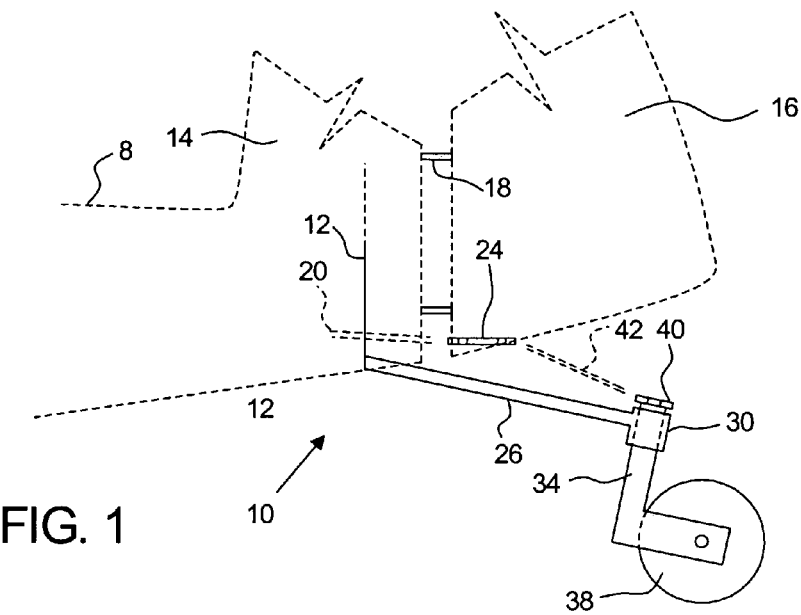
FIG. 1 is a schematic side elevation of a portion of the tail structure of a light aircraft equipped with draw spring tail wheel linkages embodying the present invention.
Figure 2:
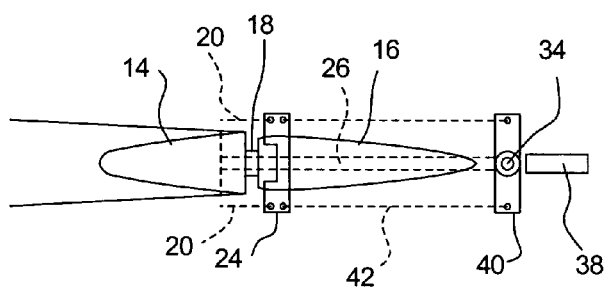
FIG. 2 is a schematic top plan view of the portion of the tail structure shown in FIG. 1.
Figure 3:
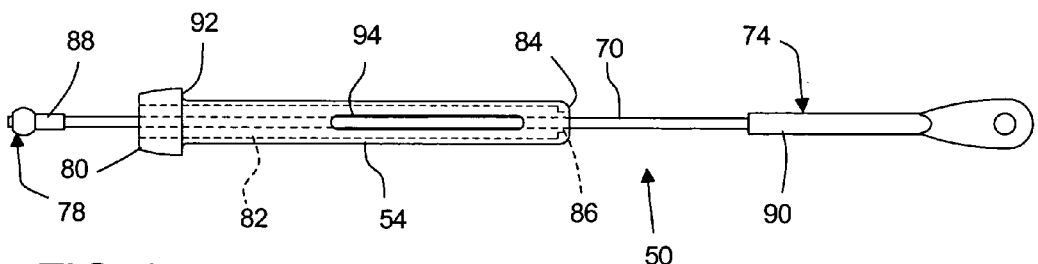
FIG. 3 is a top plan view of a partially assembled draw spring linkage embodying the present invention.
Figure 4:
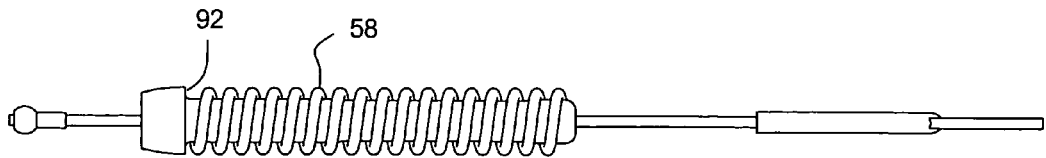
FIG. 4 is a side elevation of the linkage shown in FIG. 3.

FIG. 1 shows schematically in broken lines the skin 8 and a bulkhead 12 of a light aircraft 10. The aircraft has a vertical stabilizer 14. A rudder 16 is attached to the vertical stabilizer 14 by rudder control hinge bearings 18, which are typically rod end bearings, for rotation about an approximately vertical axis that lies in the central longitudinal plane of the aircraft. The pilot of the aircraft exercises pivotal control over the rudder 16 by means of rudder control cables 20 that are attached to the rudder structure through a rudder control horn 24. As shown in FIG. 2, the rudder control horn 24 comprises a bar that extends generally horizontally and transversely of the aircraft and has forward and aft holes at each end. The left and right rudder control cables are coupled to the rudder control horn by fasteners (not shown)

that pass through the forward holes in the rudder control horn at the two opposite ends thereof. FIG. 1 also shows a tail wheel support strut 26 which is attached at its forward end to the tail structure of the aircraft and is provided at its aft end with a bearing 30 in which a tail wheel control shaft 34 is journalled for rotation about an axis approximately perpendicular to the longitudinal axis of the strut 26. The tail wheel control shaft 34 is disposed in the central longitudinal plane of the aircraft and is provided at its lower end with a bearing structure in which the tail wheel 38 is mounted. FIG. 1 illustrates the forward end of the strut 26 attached to the bulkhead 12, but it will be appreciated that this is simply for ease of illustration and that it may be attached to any other suitable part of the tail structure of the aircraft. The tail wheel control shaft 34 is provided with a tail wheel control horn 40 having left and right ends. The left end of the rudder control horn is connected to the left end of the tail wheel control horn by a left draw spring linkage 42 and similarly the right end of the rudder control horn is connected to the right end of the tail wheel control horn by a right draw spring linkage.

The draw spring linkage 42 is shown in FIGS. 3–8 and comprises a cable subassembly 50, a spring retainer body 54, a helical compression spring 58 (FIGS. 7 and 8), a spring retainer tongue 62 (FIG. 5) and a key 66 (FIG. 6). The cable subassembly 50 comprises a flexible cable 70, an eye fitting 74 that is attached to the cable at one end by swaging, and a ball fitting 78 that is attached to the cable at its opposite end by swaging.

The spring retainer body 54 is configured as a cylindrical rod that has been drilled out from one end 80 to form a passage 82 that is large enough to receive the ball fitting 78 with a loose sliding fit. The passage 82 ends just short of the end 84 of the spring retainer body and at that end the spring retainer body is provided with a hole 86 that is large enough to allow the shank 88 of the ball fitting to enter but is not large enough to allow the ball part of the ball fitting to pass. The hole is also too small to allow the shank 90 of the eye fitting 74 to enter and accordingly the spring retainer body 54 is captive on the cable subassembly 50.

The spring retainer body has an annular shoulder 92 at its end 80 and is formed with a longitudinal slot 94. The helical compression spring 58 is threaded by the cylindrical portion of the spring retainer body and abuts the shoulder 92. The eye portion of the eye fitting 74 is too large pass through the helical spring and accordingly the spring 58 is captive on the assembly of the cable subassembly 50 and the spring retainer body 54.

Referring to FIG. 5, the spring retainer tongue 62 has an eye portion 96 and a stem 100. The eye portion 96 is provided with an attachment hole 98 and has shoulders 102 from which the stem 100 projects. The stem 100 is formed with a slot 104 near the end that is distal from the eye portion 96. The spring retainer tongue is dimensioned so that the stem can be inserted into the interior space of the spring retainer body with a loose sliding fit and the shoulders of the eye portion 96 limit penetration of the stem 100 by engaging the end 80 of the spring retainer body. When the stem is fully inserted in the spring retainer body and the cable subassembly is positioned with the shank of the ball fitting 78 located in the hole 86, the distal end of the stem is spaced from the ball fitting. The slot 104 in the stem is of substantially the same width as the slot in the spring retainer body.

The key 66 is generally C-shaped in configuration and has a forward segment 110, a middle segment 112 and a rear segment 114. The middle segment 112 has two parallel sides, the forward segment 110 has two sides that converge towards the forward end of the key, and the rear segment 114 of the key has two lugs 118 that project laterally from the parallel sides of the middle segment. A notch 120 is formed at the rear end of the key.

The thickness of the key is such that the key will fit easily in the slot 94 in the spring retainer body and the slot 104 in the stem of the spring retainer tongue.

The draw spring linkage 42 is assembled by using a spring compression tool to compress the spring 58 against the shoulder 92 of the spring retainer body while the shoulders 102 of the spring retainer tongue are held firmly against the end 80 of the spring retainer body and the slot 104 in the stem of the spring retainer tongue is aligned with the slot 94 in the spring retainer body. One suitable tool comprises a short metal tube formed with a pair of diametrically opposed longitudinal notches at each end. The eye portion 96 of the tongue 62 is held in a vise attached to the bed of a drill press with the spring retainer body 54 extending vertically upwards from the vise. The eye fitting 74 of the cable subassembly is threaded upwards through the metal tube and the cable 70 is placed in one of the notches at the upper end of the tube. The lower end of the tube is fitted over the upper end of the spring retainer body with the notches at the lower end of the tube aligned with the slot 94 in the spring retainer body. The arbor of the drill press is forced downwards onto the upper end of the metal tube and the spring is compressed until the upper end of the spring is slightly below the lower end of the slot 104 in the stem of the spring retainer tongue. The aligned slots in the spring retainer body and spring retainer tongue are accessible through the notches at the lower end of the spring compression tool, and the key 66 is then inserted in the aligned slots with the forward end of the key towards the shoulder 92 of the spring retainer body. The arbor is then raised and the spring 58 is permitted to expand. The spring engages the abutment lugs 118 of the key and forces the key towards the end 84 of the spring retainer body until the distal end of the stem is firmly seated in the notch 120 of the key and is restrained against movement farther away from the end 80 of the spring retainer body. The key is held firmly in position by the force exerted by the spring and the spring compression tool is removed. The completed draw spring linkage 42 is attached to the rudder control horn using a fastener that extends through the hole 98 in the eye portion of the spring retainer tongue and the rear hole at the left end of the rudder control horn and is attached to the tail wheel control horn using a fastener that extends through the hole in the eye fitting 74 and the hole at the left end of the tail wheel control horn. Preferably, the fastener that is used to attach the tongue to the rudder control horn is provided with a sacrificial spacer sleeve, so that wear takes place in the spacer sleeve, which is readily replaceable, rather than in the tongue or the rudder control horn.

In use of the draw spring linkage, the spring provides shock absorption to protect the rudder control system from impact in the event that the tail wheel strikes an irregularity during taxiing, takeoff or landing.

The draw spring linkage may be made of corrosion resistant materials. The illustrated draw spring linkage is more compact and streamlined in shape than the conventional draw spring linkages that are currently employed. In addition, the illustrated draw spring linkage does not employ clips for attaching the linkage to the tail wheel control horn and accordingly the danger of a clip opening and becoming detached during use does not arise.

It will be appreciated that in the event of failure of the spring 58, the spring remains captive on the spring retainer body, between the key 66 and the annular shoulder 92. Consequently, the tail wheel control horn remains attached to the rudder control horn.

In a preferred embodiment of the invention, the eye portion of the spring retainer tongue is not drilled with the attachment hole 98 until installation. This allows for some variation in the distance between the rudder control shaft 16 and the tail wheel control shaft 34. Each linkage is adapted to its particular installation by cutting the eye portion of the tongue to the appropriate length and drilling the eye portion at the appropriate location.

It is desirable that the shank of the eye fitting and the shank of the ball fitting be coaxially aligned in order to avoid bending the cable. This might necessitate bending the eye portion of the eye fitting and/or the eye portion of the tongue, for example as shown at the locations 124 illustrated in the drawings. In some applications it might be necessary or desirable to use different mechanisms from those described above in order to attach the ends of the linkage to the control horns, particularly in order to avoid excessive bending of the eye portion of the eye fitting and/or the eye portion of the spring retainer tongue.

It will be appreciated that although the draw spring linkage has been described for use in a light aircraft, the invention is not restricted to this specific application and the linkage may be used in other applications also.

It will be appreciated that the invention is not restricted to the particular embodiment that has been described, and that variations may be made therein without departing from the scope of the invention as defined in the appended claims and equivalents thereof. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

The invention claimed is:

1. A draw spring linkage comprising:
    an elongate hollow rod defining an interior space extending longitudinally of the rod, the hollow rod having first and second opposite ends and being formed with a shoulder structure at the first end of the rod and with a slot that extends longitudinally of the rod and is located between the shoulder structure and the second end of the hollow rod,
    a tongue member comprising an attachment portion and a stem that projects from the attachment portion, wherein the stem fits slidingly in the interior space of the hollow rod and is formed with a slot that is aligned with the slot in the hollow rod,
    a key member that extends through the slot in the tongue member and the slot in the hollow rod and projects laterally from the hollow rod, and
    a hollow cylindrical spring member having first and second ends, the hollow spring member being threaded by the hollow rod, the first end of the spring member engaging the shoulder structure, the second end of the spring member engaging the key member, and the spring member being held under compression between the shoulder structure and the key member.

2. A draw spring linkage according to claim 1, wherein the hollow rod has an axial opening at its second end and the linkage further comprises a cable subassembly including a flexible cable that extends through said axial opening and has a first end located in the interior space of the hollow rod and a ball fitting secured to the flexible cable at said first end thereof and of a size such that it cannot pass through said axial opening, whereby the cable subassembly is captive to the hollow rod.

3. A draw spring linkage according to claim 2, wherein the cable subassembly further includes an eye member attached to the cable at a second end thereof and including a shank that is secured to the cable and an eye portion formed with an aperture for receiving a fastener.

4. A draw spring linkage according to claim 1, further comprising a flexible cable having first and second opposite ends, the cable being attached at its first end to the second end of the hollow rod and being provided at its second end with an attachment portion formed with an aperture for receiving a fastener.

5. A draw spring linkage according to claim 1, wherein the key member has a forward end oriented towards the first end of the hollow rod and a rear end oriented towards the second end of the hollow rod, the key member is formed with a notch at the rear end, and the stem of the tongue member has a distal end portion received in the notch.

6. A draw spring linkage according to claim 5, wherein the rear end of the key includes projecting lugs that engage the second end of the spring member and the forward end of the key projects into the hollow cylindrical spring member at the second end thereof.

7. A draw spring linkage according to claim 1, wherein the attachment portion of the tongue member is formed with an opening for receiving a fastener.

8. A draw spring linkage according to claim 1, wherein the attachment portion of the tongue member is sized and shaped to limit penetration of the stem into the interior space of the hollow rod.

9. An aircraft comprising a rudder, a rudder control horn secured to the rudder for transmitting pilot effort to the rudder, a tail wheel, a tail wheel control horn secured to the tail wheel and having two opposite ends, a first tail wheel steering linkage attaching the first end of the rudder control horn to the first end of the tail wheel control horn and a second tail wheel steering linkage attaching the second end of the rudder control horn to the second end of the tail wheel control horn, for transmitting effort from the rudder control horn to the tail wheel, wherein each tail wheel steering linkage comprises:
    an elongate hollow rod defining an interior space extending longitudinally of the rod, the hollow rod having first and second opposite ends and being formed with a shoulder structure at the first end of the rod and with a slot that extends longitudinally of the rod and is located between the shoulder structure and the second end of the hollow rod,
    a tongue member comprising an attachment portion and a stem that projects from the attachment portion, wherein the stem fits slidingly in the interior space of the hollow rod and is formed with a slot that is aligned with the slot in the hollow rod,
    a key member that extends through the slot in the tongue member and the slot in the hollow rod and projects laterally from the hollow rod, and
    a hollow cylindrical spring member having first and second ends, the hollow spring member being threaded by the hollow rod, the first end of the spring member engaging the shoulder structure, the second end of the spring member engaging the key member, and the spring member being held under compression between the shoulder structure and the key member.

10. An aircraft according to claim 9, wherein the hollow rod has an axial opening at its second end and the linkage further comprises a cable subassembly including a flexible cable that extends through said axial opening and has a first end located in the interior space of the hollow rod and a ball fitting secured to the flexible cable at said first end thereof and of a size such that it cannot pass through said axial opening, whereby the cable subassembly is captive to the hollow rod.

11. An aircraft according to claim 10, wherein the cable subassembly further includes an eye member attached to the cable at a second end thereof and including a shank that is secured to the cable and an eye portion formed with an aperture for receiving a fastener.

12. Aircraft according to claim 9, further comprising a flexible cable having first and second opposite ends, the cable being attached at its first end to the second end of the hollow rod and being provided at its second end with an attachment portion formed with an aperture for receiving a fastener.

13. An aircraft according to claim 9, wherein the key member has a forward end oriented towards the first end of the hollow rod and a rear end oriented towards the second end of the hollow rod, the key member is formed with a notch at the rear end, and the stem of the tongue member has a distal end portion received in the notch.

14. An aircraft according to claim 13, wherein the rear end of the key includes projecting lugs that engage the second end of the spring member and the forward end of the key projects into the hollow cylindrical spring member at the second end thereof.

15. An aircraft according to claim 9, wherein the attachment portion of the tongue member is formed with an opening for receiving a fastener.

16. An aircraft according to claim 9, wherein the attachment portion of the tongue member is sized and shaped to limit penetration of the stem into the interior space of the hollow rod.

* * * * *